United States Patent [19]

Wolfe et al.

[11] Patent Number: 4,552,913

[45] Date of Patent: Nov. 12, 1985

[54] ONE COMPONENT POLYURETHANE SMC SURFACE COAT

[75] Inventors: James D. Wolfe, North Canton, Ohio; Michael E. Kimball, West Brook, Me.; Richard E. Fruzzetti, Wadsworth, Ohio

[73] Assignee: The Goodyear Tire & Rubber Company, Akron, Ohio

[21] Appl. No.: 691,247

[22] Filed: Jan. 14, 1985

[51] Int. Cl.$^4$ .............................................. C08L 75/08
[52] U.S. Cl. ................... 524/240; 264/255; 264/257; 264/279; 264/279.1; 264/331.12; 264/331.15; 264/331.16; 528/52
[58] Field of Search .......... 524/240; 528/52; 264/255, 257, 279, 279.1, 331.12, 331.15, 331.16

[56] References Cited

U.S. PATENT DOCUMENTS 4,366,109 12/1982 Svoboda ...................... 264/331.12
4,477,405 10/1984 Makhlouf et al. .................. 264/279

*Primary Examiner*—Maurice J. Welsh
*Attorney, Agent, or Firm*—J. D. Wolfe; Alvin T. Rockhill

[57] ABSTRACT

A one component polyurethane precursor suitable as an in-mold coating composition composed of a prepolymer of an organic polyisocyanate with a polyol of a polyether polyol of 2 and 3 hydroxyl groups or a polyester polyol of 2 and 3 hydroxyl groups to give a free NCO content of about 3 to about 15% with a salt complex of a diamine, such as NaCl complex of MDA. The amount of filler and plasticizer, viz, those preferably of the crown or pseudocrown ethers preferably are adjusted to give the precursors a viscosity of about 5 to about 50 pascal seconds at the temperature the precursors are applied, but usually less than about 80° C. These precursors are spread, applied or preferably injected onto the surface of the fiberglass molding viz a polyester or epoxy resin one and pressed at a pressure of about 5 to 200 psi (34,475 to 1,379,000 pascals) and higher at a temperature of at least 80° C. to cure the precursor to give a polyurethane coating on the fiberglass molding.

4 Claims, No Drawings

ONE COMPONENT POLYURETHANE SMC SURFACE COAT

ART FIELD

This invention relates to in-mold coatings and to a simplified method that does not need high pressure mixing and metering equipment as the in-mold coating composition is storage stable for several months without appreciable gain in viscosity.

PRIOR ART

The art of in-mold coatings came into being because moldings of epoxy resins/glass fiber and vinyl ester/glass fiber, known in the trade as SMC and BMC moldings, frequently had skins that were unsightly due to surface defects such as voids, sinks, and porosity. These defects required costly hand refinishing before being painted. Also, the hand refinishing many times destroyed the molded pattern embossed in the surface and the article had to be scrapped. The industry generally has adopted the General Tire and/or General Motors methods of in-mold coatings to avoid or eliminate these surface defects.

The nature of the in-mold coating methods are well known.

Both the General Tire and the General Motors methods require very elaborate and expensive equipment to be used in conjunction with the usual in-mold molding as both methods need equipment to meter the polyol and the organic polyisocyanate and curative to the mixing head and then to the mold. Since all of the ingredients are extremely reactive, the viscosity of the in-mold coating can and does vary extensively depending on the ratio of the reactants being fed to the mixing head and the efficiency of the mixing head as a consequence of this great reactivity that causes an extremely fast rise in viscosity, difficulty is experienced in getting the proper amount of in-mold molding composition in the mold and spread on the surface of the shaped article before the viscosity gets too high. Thus, high pressure metering, mixing, pumping equipment is needed to attempt to get the proper coating. Also, due to the great variation in viscosity and great reactivity of the composition, very high pressures are required to insure the coating is properly distributed over the surface of the shaped or molded article. Also, the molds have to be modified to get even mold closure and in some incidences, auxiliary hydraulic jacks are used to facilitate even closing of the mold halves. Also, since the mixed reactants are extremely reactive at room temperature, means must be provided to flush the mixing head and charge line after each time the mixer is used. This invention eliminates the need for flushing after each charge to the mold.

SUMMARY DESCRIPTION OF THE INVENTION, INCLUDING THE BEST MODE

A storable polyurethane composition composed of (a) a prepolymer of a polypropylene ether glycol or a similar polyol, such as poly(tetramethylene ether glycol) and sufficient organic polyisocyanate to give preferably an excess of about 3 to 15 percent NCO in said prepolymer with the proviso that the free NCO is obtained preferably from methylenediphenyl diisocyanate (the other commercial organic polyisocyanate can be used too), and (b) a complex of an alkali metal salt with 4,4'-methylenedianiline (MDA), said composition being relatively inactive at temperatures below 100° C., but being heat activatible at much higher temperatures to effect a cure. In one embodiment of this improved composition, a catalyst may be present in said composition to effectively lower the cure temperature. This is a crown or pseudocrown ether containing radicals having the formula $(y-CH_2-CH_2)n$ with y being nitrogen, sulfur or oxygen and n has values sufficient to form the crown structure, viz at least 3 or more compositions containing the catalyst is a preferred embodiment for the storable polyurethane composition having a viscosity that allows it to be applied to the shaped fiber glass composite of either polyester or epoxy resins. Preferably the viscosity is low enough to be a liquid or spreadable like a paste at 100° C. or lower. The in-mold coating composition is applied to the surface of the shaped part in at least one place and the mold is closed to exert a pressure of about 200 to 900 psi (1,379,000 to 6,205,500 pascals) at a temperature of about 180° C. or higher to adhere and cure the coating to the shaped article.

An in-mold molding composition was prepared by reacting 100 parts of polypropylene ether glycol of about 1000 to 2000 molecular weight having 50 parts of fine powdery silica mixed therein with 50 parts of diphenyl methane diisocyanate (sometimes called MDI) under anhydrous conditions to give a prepolymer. The prepolymer was allowed to cool to about 37°–45° C. and then 67 parts of a salt complex of MDA known as Caytur TM 22 was mixed therein with cooling to keep the temperature from rising. The composition was storage stable for several months. After a month the composition was used to in-mold coat molded commercial polyester fiber glass molding composition, designated as J-479 SCM molding composition. The J-479 sample was molded to shape it and then the above storage stable composition was applied as a blob of paste like material to the molded surface and then the mold was reclosed to squeeze the storage stable composition over the SCM molded surface and cured for one minute. The press was opened and the in-mold coated panel was deflashed, air dried and spray painted with a standard Ford primer, identified as Seibert oxidermo BP-2024-7. The paint was baked on the panel and cooled. The paint adhesion was determined using the cross-hatch test and was rated 100% and thus satisfactory for use in an automobile part as it had the smooth finish required of automobile parts.

Another storage stable polyurethane was made by first forming a prepolymer by reacting 200 parts of a 2000 molecular weight polypropylene ether glycol, 200 parts of a filler viz talc with 140 parts of a flaked MDI and about 7.5 to 15 parts of urea and then the prepolymers were mixed with 200 parts of a metal complex of 4,4'-diphenyl methane dianiline and sodium chloride dispersed in polytetramethylene adipate at a temperature of about 100° C. This flowable composition at a pressure of less than 10 psi (68,950 pascals) was storable for several months and still was flowable. It was satisfactory to coat a molded FRP fiber glass article and flowed to give a smooth paintable surface on the fiber glass article. It has been discovered that crown or pseudocrown ethers can be used as a plasticizer of the salt amine complexes to cause them to cure the polyurethane at a lower temperature and to adjust the viscosity.

While certain representative embodiments and details have been shown for the purpose of illustrating the invention, it will be apparent to those skilled in this art that various changes and modifications may be made therein without departing from the scope of the invention.

What is claimed is:

1. A method of in-mold coating a molded shaped article composed of epoxy/glass fibers or vinyl ether/glass fibers comprising applying a stable one component polyurethane precursor comprising a polyurethane prepolymer having about 3 to 15% NCO by weight and a salt complex of a diamine to a shaped surface of the article closing the mold on the shaped article under a pressure of about 500 to 900 psi (34,475 to 1,379,000 pascals) and a temperature of at least 80° C. to spread the precursor over the surface of the shaped article and cure it, and open the mold to remove the polyurethane coated article.

2. An in-mold coating composition comprising a stable one component polyurethane precursor composed of a prepolymer of sufficient organic polyisocyanate and at least one polyol having a molecular weight of about 500 to 10,000 to give the prepolymer a free NCO content of 2 to 15% by weight, a salt complex of a diamine and sufficient filler and plasticizer to give the precursor a viscosity of about 5 to 50 pascal seconds at the injection temperature.

3. The in-mold coating composition of claim 2 wherein the injection temperature is less than 80° C.

4. The in-mold coating composition of claim 2 where the polyol is a polypropylene ether polyol.